United States Patent [19]

Sonobe et al.

[11] Patent Number: 5,721,071
[45] Date of Patent: Feb. 24, 1998

[54] GRAPHITIC ELECTRODE MATERIAL FOR SECONDARY BATTERY AND PROCESS FOR PRODUCTION THEREOF

[75] Inventors: Naohiro Sonobe; Jiro Masuko; Akio Hoshi, all of Iwaki, Japan

[73] Assignee: Kureha Kagaku Kogyo Kabushiki Kaisha, Tokyo, Japan

[21] Appl. No.: 718,939

[22] Filed: Sep. 24, 1996

[30] Foreign Application Priority Data

Sep. 26, 1995 [JP] Japan ................................. 7-273440

[51] Int. Cl.$^6$ ........................................... H01M 4/58
[52] U.S. Cl. ........................ 429/218; 429/194; 423/448
[58] Field of Search ............................ 429/218, 194, 429/209; 423/448

[56] References Cited

U.S. PATENT DOCUMENTS

| | | |
|---|---|---|
| 5,244,757 | 9/1993 | Takami et al. . |
| 5,350,648 | 9/1994 | Kagawa et al. . |
| 5,527,643 | 6/1996 | Sonobe et al. . |

FOREIGN PATENT DOCUMENTS

| | | |
|---|---|---|
| 0495613 | 7/1992 | European Pat. Off. . |
| 0563988 | 10/1993 | European Pat. Off. . |
| 0567658 | 11/1993 | European Pat. Off. . |
| 0593785 | 4/1994 | European Pat. Off. . |
| 0624913 | 11/1994 | European Pat. Off. . |
| 0634805 | 1/1995 | European Pat. Off. . |
| 0646978 | 4/1995 | European Pat. Off. . |

OTHER PUBLICATIONS

Database WPI, Section Ch, Week 9432, Derwent Publications Ltd., London, GB; Class A35, AN 94-258086, XP002021514 & JP-A-06 187 972 (Osaka Gas Co Ltd), Jul. 8, 1994 *abstract*.

Database WPI, Section Ch, Week 9401, Derwent Publications Ltd., London, GB; Class A85, AN 94-003097, XP002021515 & JP-A-05 314 975 (Mitsubishi Kasei Corp), Nov. 26, 1993 *abstract*.

Primary Examiner—John S. Maples
Attorney, Agent, or Firm—Wenderoth, Lind & Ponack

[57] ABSTRACT

A graphitic electrode material suitable for use in a non-aqueous solvent-type secondary battery is provided. The graphitic material is characterized by an average (002)-plane spacing $d_{002}$ of 0.336–0.345 nm, a crystallite size along c-axis $L_{c(002)}$ of 15–60 nm, and a lattice strain $\epsilon$ of at most $2.0 \times 10^{-2}$ nm$^{-1}$ as measured by X-ray diffraction method. The graphitic material may suitably be formed through a process including the steps of: thermally polymerizing a condensed polycyclic aromatic compound in the presence of a Lewis acid catalyst to form a polymerizate, and heat-treating the polymerizate at 2100°–2600° C. under a reduced pressure or in an inert gas atmosphere. The graphitic electrode material exhibits large doping and dedoping capacities which provide only a small difference therebetween (i.e., irreversible capacity) and cause only a small decrease at the time of quick charging and discharging.

10 Claims, 6 Drawing Sheets

GRAPHITIC ELECTRODE MATERIAL FOR SECONDARY BATTERY AND PROCESS FOR PRODUCTION THEREOF

FIELD OF THE INVENTION AND RELATED ART

The present invention relates to a graphitic material suitable as an electrode material for a non-aqueous solvent-type secondary battery, a process for producing such a graphitic electrode material, and electrode structure comprising such a graphitic electrode material, and a non-aqueous solvent-type secondary battery having such an electrode structure.

Along with the trend of reduction in size an weight of VTR (video tape recorders) and small-size telecommunication devices, there has been an increasing demand for high-energy density secondary batteries as a power supply for such devices. In response to such a demand, some proposals have been made regarding non-aqueous solvent-type lithium secondary batteries (e.g., Japanese Laid-Open Patent Application (JP-A) 57-208079, JP-A 62-90863, JP-A 62-122066, JP-A 2-66856). According to these proposals, a negative electrode is formed by doping a carbonaceous material with lithium instead of using a lithium metal electrode, thereby to remove a liability of internal short circuit caused by the occurrence of dendrite and provide improved charge-discharge characteristic and storage stability.

In all the above-mentioned proposals, the carbonaceous negative electrode materials for non-aqueous solvent-type lithium secondary batteries are formed of graphite or a carbonaceous material obtained by carbonizing an organic material.

In order to prepare a battery having a high energy density, it is important to use an electrode material which can be doped and de-doped with (i.e., can store and release) a large quantity of active substance, such as lithium. For this purpose, it is necessary to use an electrode material having large doping and de-doping capacities for active substance per unit weight or volume, and fill the negative electrode of a battery with as much electrode material as possible.

In case of using a so-called non-graphitizable carbonaceous material obtained by carbonizing phenolic resin or furan resin at a relatively low temperature on the order of 800°–1500 °C., it is possible to obtain high doping and de-doping capacities per unit weight, but the weight per unit volume thereof is not large enough because of a low true density on the order of 1.6 g/cm$^3$. As a result, a secondary battery having a negative electrode comprising such a non-graphitizable carbonaceous material does not necessarily have a large energy density per volume. Further, the use of a negative electrode of such a non-graphitizable carbonaceous material is also accompanied with difficulties such that an active substance doping the carbonaceous material is not completely de-doped (i.e., released) to leave and waste a substantial amount of active substance in the negative electrode, and the discharge potential is gradually lowered as the discharge quantity increases.

On the other hand, a graphitic material may have a large true density comparable to the theoretical density (2.27 g/cm$^3$) of graphite and is advantageous in that it can be packed in a large quantity in a unit volume of negative electrode. A graphitic material having a higher crystallinity is generally said to have a large doping capacity, which approaches the theoretical doping capacity of a graphite intercalation compound. However, a graphitic material having a large crystallite size along c-axis $L_{c(002)}$ is caused to have an increased crystallite strain during repetition of doping and de-doping, thus being liable to cause crystal rupture. As a result, a secondary battery formed by using a graphitic material having a large $L_{c(002)}$ value and a developed graphite structure is liable to have an inferior charge-discharge cycle characteristic. Further, as the doping and de-doping of a graphitic material with an active substance proceeds through graphite plane edge surfaces, a graphitic material having a large crystallite size along c-axis has a relatively small graphite plane edge surface area, so that the doping and de-doping are retarded thereby. As a result, if a battery using such a graphitic material is subjected to quick charge or discharge, the doping or de-doping capacity is caused to decrease remarkably, or the electrolytic solution is liable to be decomposed due to an increased over-voltage.

On the other hand, a carbonized mesophase bead material having a (002)-plane spacing $d_{002}$ of at most 3.45 Å, preferably 3.33–3.45 Å, and a c-axis crystallite size of at least 300 Å, preferably 300–800 Å, obtained from pitch, is known to have a large active substance-doping capacity and provide an electrode material showing a large packing density, thus being an excellent electrode material for a non-aqueous solvent-type secondary battery. The carbonized mesophase bead material is produced by heat-treating petroleum pitch or coal pitch for 1–2 hours at 400°–450° C. and treating the heat-treated pitch with pyridine or quinoline to recover mesophase beads, and calcining the mesophase beads at a temperature of 1500°–3000° C., particularly 2000°–2500° C., for 5–50 hours in an inert gas atmosphere. The production process, however, includes the step of recovering the mesophase beads by using pyridine or quinoline, which step is complicated and requires expensive pyridine or quinoline.

SUMMARY OF THE INVENTION

In view of the above-mentioned problems, an object of the present invention is to provide a graphitic electrode material having a large true density and large lithium doping and de-doping capacities and also a small irreversible capacity which is a difference between the doping and de-doping capacities (i.e., a high active substance utilization rate), thus providing a secondary battery of a high energy density.

Another object of the present invention is to provide a graphitic electrode material which is little liable to cause a decrease in capacity during quick charging and discharging and has an excellent charge-discharge cycle characteristic.

Another object of the present invention is to provide a process for producing such a carbonaceous material.

A further object of the present invention is to provide a secondary battery using such a graphitic electrode material.

We have found it possible to provide such a graphitic electrode material by appropriately controlling the microtexture of a graphitic material, thus arriving at the present invention.

According to the present invention, there is provided a graphitic electrode material for a non-aqueous solvent-type secondary battery, characterized by having an average (002)-plane spacing $d_{002}$ of 0.336–0.345 nm, a crystallite size along c-axis $L_{c(002)}$ of 15–60 mm, and a lattice strain ε of at most $2.0 \times 10^{-2}$ nm$^{-1}$ as measured by X-ray diffraction method.

According to another aspect of the present invention, there is provided a process for producing a graphitic electrode material for a non-aqueous solvent-type, comprising the steps of: thermally polymerizing a condensed polycyclic aromatic compound in the presence of a Lewis acid catalyst to form a polymerizate, and heat-treating the polymerizate at 2100°–2600° C. under a reduced pressure or in an inert gas atmosphere.

According to another aspect of the present invention, there is provided a battery electrode structure, comprising: an electroconductive substrate and a composite electrode layer disposed on at least one surface of the electroconductive substrate; the composite electrode layer comprising a carbonaceous material as described above in a particulate form, and a binder.

According to a further aspect of the present invention, there is provided a battery, comprising a positive electrode, a negative electrode, and an electrolyte disposed between the positive and negative electrodes; at least one of the positive and negative electrodes comprising an electrode structure as described above.

These and other objects, features and advantages of the present invention will become more apparent upon a consideration of the following description of the preferred embodiments of the present invention taken in conjunction with the accompanying drawings.

DETAILED DESCRIPTION OF THE INVENTION

The graphitic material according to the present invention has a moderately developed graphite structure and characterized by having an average (002)-plane spacing $d_{002}$ (hereinafter sometimes simply referred to as "$d_{002}$") of 0.336–0.345 nm, a crystallite size along c-axis $L_{c(002)}$ (hereinafter sometimes simply referred to as "$L_{c(002)}$") of 15–60 nm, and a lattice strain $\epsilon$ of at most $2.0\times10^{-2}$ nm$^{-1}$ as measured by X-ray diffraction method.

If a graphitic material having $d_{002}<0.336$ nm or $L_{c(002)}>60$ nm and having a highly developed graphite structure is used as an electrode material for a non-aqueous solvent-type secondary battery, the graphitic material is liable to be collapsed or the electrolytic solution is liable to be decomposed during repetition of doping and dedoping with the active substance (i.e., repetition of charging and discharging), thus exhibiting an inferior cycle characteristic. On the other hand, a carbonaceous material having $d_{002}>0.345$ nm and $L_{c(002)}<15$ nm and having an undeveloped graphite structure exhibits small capacities for doping and dedoping with an active substance (i.e., provides a secondary battery having small charge-discharge capacities) when used as an electrode material for a non-aqueous solvent-type secondary battery. It is preferred to use a graphitic material having $d_{002}$ of 0.337–0.342 nm and $L_{c(002)}$ of 20–50 nm.

As mentioned above, the graphitic material according to the present invention is characterized by a lattice strain $\epsilon$ of at most $2.0\times10^{-2}$ nm$^{-1}$. Even if the above-mentioned $d_{002}$ and $L_{c(002)}$ requirements are satisfied, a graphitic material having a lattice strain $\epsilon$ exceeding $2.0\times10^{-2}$ nm$^{-1}$ does not readily provide an intercalation compound and exhibits a phenomenon that the mobility of an active substance between graphite layers is lowered because of a large graphite lattice strain. As a result, the battery performances are adversely affected such that the capacity for doping with an active substance, such as lithium, is lowered and the irreversible capacity is increased. It is preferred that the lattice strain $\epsilon$ is at most $1.5\times10^{-2}$ nm$^{-1}$.

The graphitic material according to the present invention may exhibit an optically anisotropic texture showing a flow texture when a buffed surface thereof is observed through a polarizing microscope.

In order to provide an electrode structure and a secondary battery exhibiting large capacities for doping and dedoping with an active substance per volume, it is preferred to use a graphitic material having a true density of at least 1.90 g/cm$^3$, more preferably 2.00–2.25 g/cm$^3$, more preferably 2.10–2.25 g/cm$^3$.

The graphitic material according to the present invention may for example be produced through a process as described below. One or more species of condensed polycyclic aromatic compounds are thermally polymerized in the presence of a Lewis acid catalyst to obtain a polymerizate, and the polymerizate is subjected to further polycondensation under heating at 350°–700° C. in an inert gas atmosphere while removing low-boiling point components to obtain a carbon precursor having an optical flow texture. The carbon precursor is graphitized at 2100°–2600° C. under a reduced pressure or in an inert gas atmosphere.

Examples of the condensed polycyclic aromatic compounds may include naphtharene, anthracene, acenaphthene, acenaphthylene, pyrene, and derivatives of these having one or more aliphatic substituents, e.g., lower alkyls, such as methyl and ethyl. Among these, naphthalene is most suitably used.

Examples of the Lewis acid catalyst may include: aluminum chloride, boron trifluoride, aluminum bromide, tin chloride, iron chloride, zinc chloride, and hydrogen fluoride-boron trifluoride complex. Among these, aluminum chloride is most suitably used.

In the thermal polymerization, a Lewis acid catalyst may be used in an amount of 5–50 wt. parts, preferably 8–20 wt. parts, per 100 wt. parts of a condensed polycyclic aromatic compound. The use of a Lewis acid catalyst in excess of 50 wt. parts does not substantially change the polymerization rate of the condensed polycyclic aromatic compound but makes difficult the removal of the catalyst from the polymerizate.

The thermal polymerization may generally be performed at a temperature of at least 100° C. in a non-oxidizing gas atmosphere. Thermal polymerization below 100° C. is not desirable because of a small polymerization velocity. The non-oxidizing gas atmosphere is used for the thermal polymerization so as to prevent the polymerizate formed by thermal polymerization from being oxidized to result in a non-graphitizable carbon precursor. The non-oxidizing gas may be nitrogen gas, argon gas, helium gas or a mixture of these.

The Lewis acid catalyst may be removed as desired from the polymerizate obtained by thermal polymerization of a condensed polycyclic aromatic compound. Aluminum chloride may be easily removed by washing with water or filtration. Hydrogen fluoride-boron trifluoride complex catalyst does not require the removal of the catalyst. Accordingly, these may be regarded as preferred catalysts.

Prior to graphitization, the polymerizate may be heat-treated at 350°–700° C. in an inert gas atmosphere to effect further polycondensation and remove light fractions, thereby providing a carbon precursor having an optically anisotropic texture, i.e., a so-called flow texture. The volatile content of the carbon precursor may be reduced to at most 15%, preferably at most 10%, further preferably at most 5%. This is because fine particles of the carbon precursor formed by pulverization do not cause melt-sticking to each other during a subsequent calcination step, and the occurrence of decomposed gas and tar can be suppressed, so that the load in the carbonization (calcination) step can be reduced.

In the process according to the present invention, the carbon precursor prepared in the above-described manner may be graphitized at 2100°–2600° C. under a reduced pressure or in an inert gas atmosphere. The graphitization can be performed by continuously heating the carbon precursor to the graphitization temperature (2100°–2600° C.) so as to effect the carbonization and the graphitization continuously. It is however preferred in many cases to once effect the carbonization (calcination) at a temperature of, e.g., 500°–1500° C. lower than the graphitization temperature and then effect the graphitization, so as to facilitate the designing of the material and structure of the apparatus, the heating method, etc.

In case where a graphitic material in a fine powdery form is required, the graphitic material after graphitization can be pulverized. Alternatively, it is also possible to pulverize a carbon precursor having a suppressed volatile content of at most 15 wt. % before carbonization and graphitization to produce a powdery graphitic material.

A carbon precursor before carbonization can be pulverized much more easily with less damage, such as abrasion of a pulverizer, than carbonized or graphitized product, so that the pulverization before the carbonization is very advantageous.

Further, a secondary battery produced by using a powdery graphitic material prepared through pulverization before graphitization is less liable to cause the decomposition of an electrolytic solution during repetition of charging and discharging of the secondary battery than a secondary battery using a powdery graphitic material obtained by pulverization after graphitization. Also from this viewpoint, the pulverization before graphitization is preferred.

In case of performing the pulverization after graphitization, it is preferred to heat-treat the graphitic material after the pulverization at a temperature of at least 800° C. in an inert gas atmosphere or under a reduced pressure.

The pulverization may desirably be performed to provide an average diameter of at most 100 μm, preferably 50–5 μm.

The graphitization may be performed by retaining a graphite precursor (i.e., material to be graphitized) at a graphitization temperature of 2100°–2600° C. for ca. 10 minutes to ca. 10 hours in an inert gas atmosphere or under a reduced pressure. Herein, the graphitization temperature refers to a maximum temperature to which the graphite precursor is subjected during the graphitization.

It is difficult to obtain a graphitic material having the above-mentioned properties at a graphitization temperature below 2100° C. or above 2600° C. The graphitization may be performed under a reduced pressure or in an inert gas atmosphere so as to prevent the reaction of the graphite precursor with the atmospheric gas during the graphitization. The inert gas may for example be argon gas or helium gas. In the case of graphitization at a reduced pressure, the reduced pressure may preferably be given by an inert gas as described above.

The graphitic material according to the present invention can also be produced by graphitizing petroleum pitch or coal pitch at 2600°–2900° C. In this case, however, such a higher graphitization temperature than in the above-described process is required so that the latitude of material selection for the graphitization apparatus is narrowed and the energy consumption is increased.

The graphitic material according to the present invention has a micro-texture suitable for doping with an alkaline metal, such as lithium and is particularly suitably used as an electrode material for lithium secondary batteries constituting a negative electrode or a positive electrode of the batteries, as desired. Of these, the graphitic material may preferably be used as an electrode material for constituting a negative electrode of a non-aqueous solvent-type lithium secondary battery to be doped with lithium (ions) as an active substance of the negative electrode.

Figure 1:
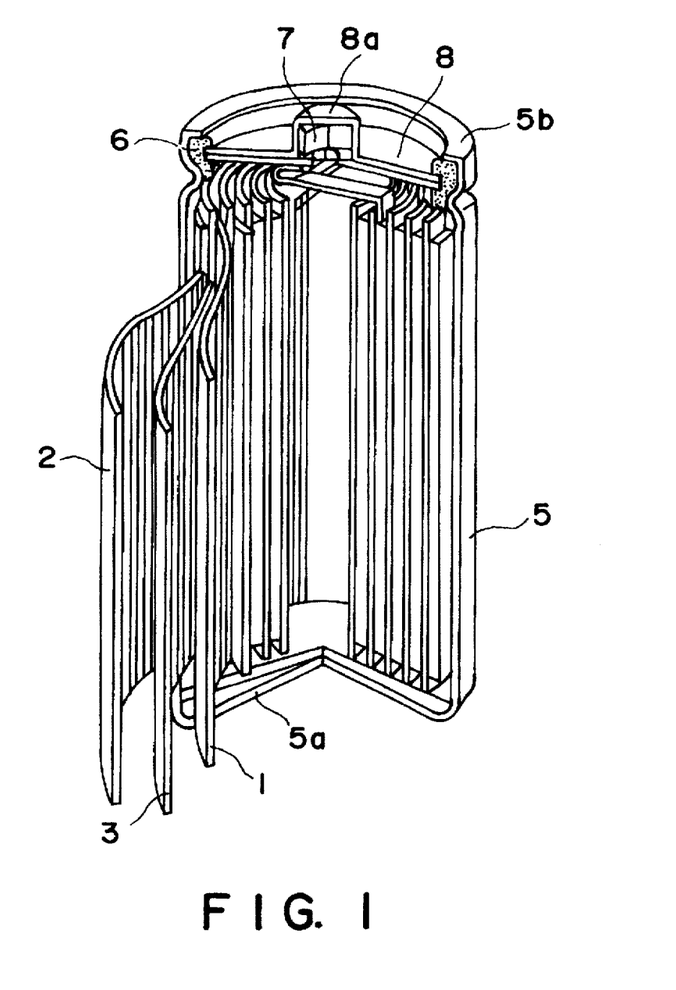
FIG. 1 is a partially exploded perspective view of a non-aqueous solvent-type secondary battery which can be constituted according to the invention.

FIG. 1 is a partially exploded perspective view of a non-aqueous solvent-type lithium secondary battery as an embodiment of a non-aqueous solvent-type secondary battery according to the present invention.

More specifically, the secondary battery basically includes a laminate structure including a positive electrode 1, a negative electrode 2 and a separator 3 disposed between the positive and negative electrodes 1 and 2 and comprising a fine porous film of a polymeric material, such as polyethylene or polypropylene, impregnated with an electrolytic solution. The laminate structure is wound in a vortex shape to form an electricity-generating element which is housed within a metal casing 5 having a bottom constituting a negative electrode terminal 5a. In the secondary battery, the negative electrode 2 is electrically connected to the negative electrode terminal 5a, and the uppermost portion of the battery is constituted by disposing a gasket 6 and a safety valve 7 covered with a top plate 8 having a projection constituting a positive electrode terminal 8a electrically connected to the positive electrode. Further, the uppermost rim 5b of the casing 5 is crimped toward the inner side to form an entirely sealed cell structure enclosing the electricity-generating element.

Figure 2:
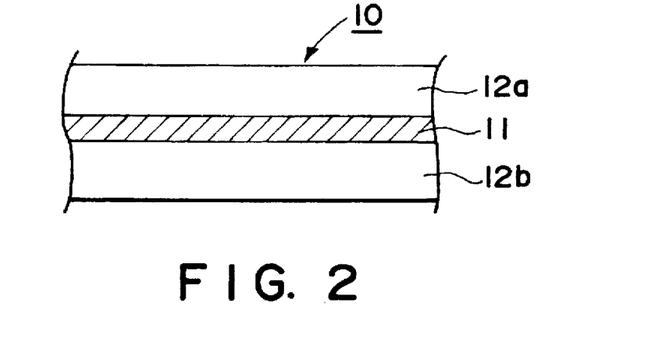
FIG. 2 is a partial sectional view of an electrode structure adopted in the secondary battery.

Herein, the positive electrode 1 or negative electrode 2 may be constituted by an electrode structure 10 having a sectional structure as partially shown in FIG. 2. More specifically, the electrode structure 10 includes an electroconductive substrate 11 comprising a foil or wire net of a metal, such as iron, stainless steel, steel, aluminum, nickel or titanium and having a thickness of, e.g., 5–100 μm, or 5–20 μm for a small-sized battery, and a composite electrode layer (12a, 12b) of, e.g., 10–1000 μm, preferably 10–200 μm, in thickness for a small-sized battery, on at least one surface, preferably on both surfaces as shown in FIG. 2, of the electroconductive substrate 11.

The composite electrode layers 12a and 12b are respectively a layer comprising a particulate graphitic material according to the present invention, an electroconductive material such as electroconductive carbon, optionally included, and a binder such as a vinylidene fluoride resin.

More specifically, in case of using the graphitic material according to the present invention for producing an electrode 10 (FIG. 2; corresponding to 1 or 2 in FIG. 1) of a non-aqueous solvent-type secondary battery as described above, the graphitic material may be optionally formed into fine particles having an average particle size of 5–100 μm and then mixed with a binder stable against a non-aqueous solvent, such as polyvinylidene fluoride, polytetrafluoroethylene or polyethylene, to be applied onto an electroconductive substrate 11, such as a circular or rectangular metal plate, to form, e.g., a 10–200 μm-thick layer. The binder may preferably be added in a proportion of 1–20 wt. % of the graphitic material. If the amount of the binder is excessive, the resultant electrode is liable to have too large an electric resistance and provide the battery with a large internal resistance. On the other hand, if the amount of the binder is too small, the adhesion of the graphitic material particles with each other and with the electroconductive substrate 11 is liable to be insufficient. The above described formulation and values have been set forth with respect to production of a secondary battery of a relatively small capacity, whereas, for production of a secondary battery of a larger size, it is also possible to form the above-mentioned mixture of the graphitic material fine particles and the binder into a thicker shaped product, e.g., by press-forming, and electrically connect the shaped product to the electroconductive substrate.

The graphitic material of the present invention can also be used as a positive electrode material for a non-aqueous solvent-type secondary battery by utilizing its good doping characteristic but may preferably be used as a negative electrode material of a non-aqueous solvent-type secondary battery, particularly for constituting a negative electrode to be doped with lithium as an active substance of a lithium secondary battery.

In the latter case, the positive electrode material may comprise a complex metal chalcogenide, such as $LiCoO_2$, $LiNiO_2$ or $LiMnO_4$. Such a positive electrode material may be foamed in combination with an appropriate binder and a carbonaceous material into a layer on an electroconductive substrate.

The non-aqueous solvent-type electrolytic solution used in combination with the positive electrode and the negative electrode described above may generally be formed by dissolving an electrolyte in a non-aqueous solvent. The non-aqueous solvent may comprise one or two or more species of organic solvents, such as propylene carbonate, ethylene carbonate, dimethyl carbonate, diethyl carbonate, dimethoxyethane, diethoxyethane, γ-butyrolactone, tetrahydrofuran, 2-methyl-tetrahydrofuran, sulfolane, and 1,3-dioxolane. Examples of the electrolyte may include $LiClO_4$, $LiPF_6$, $LiBF_4$, $LiCF_3SO_3$, $LiAsF_6$, LiCl, LiBr, $LiB(C_6H_5)_4$, $LiN(SO_2CF_3)_2$, alkaline metal salts, and tetralkylammonium salts.

As described above, a secondary battery of the present invention may generally be formed by disposing the above-formed positive electrode 1 and negative electrode 2 opposite to each other, optionally with a liquid-permeable separator 3 composed of, e.g., unwoven cloth or other porous materials, disposed therebetween, and dipping the positive and negative electrode layers optionally together with a liquid-permeable separator in an electrolytic solution as described above (FIG. 1).

In the above, a cylindrical battery has been described as an embodiment of the non-aqueous solvent-type secondary battery according to the present invention. However, the non-aqueous solvent-type secondary battery according to the present invention can basically have any other shape, such as those of a coin, a rectangular parallelepiped, or a paper or sheet.

As described above, according to the present invention, it has become possible to provide a graphitic material having a high density, large capacities for doping and dedoping with an active substance and a small irreversible capacity, which is a difference between the doping and dedoping capacities, e.g., through a process including the steps of carbonizing and graphitizing a condensed. polycyclic aromatic compound to appropriately control the micro-texture of the graphitic material.

Further, by controlling the crystallite size of the graphitic material to facilitate the doping and dedoping of the graphitic material with an active substance, it has become possible to prevent a decrease in capacity liable to accompany quick doping and dedoping.

The thus-obtained graphitic material according to the present invention exhibits excellent performances inclusive of quick chargeability and dischargeability, suitable as a graphitic electrode material for a non-aqueous solvent-type secondary battery of a high energy density.

In the process for producing a graphitic material according to the present invention, a condensed polycyclic aromatic compound is thermally polymerized in the presence of a Lewis acid catalyst and then graphitized at 2100°–2600° C. Accordingly, unlike a process for producing carbonized mesophase beads from pitch, it is unnecessary to include a step of separating mesophase microbeads or use an expensive reagent, such as pyridine or quinoline for the separation. Thus, the production process has been simplified, and it has become possible to omit a step of solvent recovery, etc.

Incidentally, the parameters, $d_{002}$, $L_{c(002)}$, lattice strain ε and true density characterizing graphitic materials, and the volatile content and softening point of a pitch, referred to herein are based on the measurement or test performed in the following manner. Further, some graphitic materials were observed through a polarizing microscope in a manner described below.

[$d_{002}$, $L_{c(002)}$ and ε of graphitic material]

A powdery sample of a graphitic material is packed in an aluminum-made sample cell and is irradiated with monochromatic CuKα rays (wavelength λ=0.15418 nm) through a graphite monochromator to obtain an X-ray diffraction pattern according to a reflection-type defractometer method. The correction of a diffraction pattern is performed only with respect to corrections of $Kα_1$–$Kα_2$ doublet according to the Rachinger's method and without correction with respect to the Lorentz's polarization factor, absorption factor, atomic scattering factor, etc. The peak position of the diffraction pattern is determined by the center of gravity method (i.e., a method wherein the position of a gravity center of diffraction lines is obtained to determine a peak position as a 2θ value corresponding to the gravity center) and calibrated by the diffraction peak of (111) plane of high-purity silicon powder as the standard substance. The $d_{002}$ value is calculated from the Bragg's formula shown below.

$L_{c(002)}$ is calculated by the Scherrer's equation shown below based on a value $β_{1/2}$ which is a difference obtained by subtracting a half-width value of the (111) diffraction peak of high-purity silicon powder as the standard substance from the half-value width of the (002) diffraction peak of a sample carbonaceous material. Herein, the shape factor k is set to 0.9.

$d_{002}=λ/(2·\sinθ)$ (Bragg's equation)

$L_{c(002)}=(k·λ)/(β_{1/2}·\cosθ)$ (Scherrer's equation)

Figure 7:
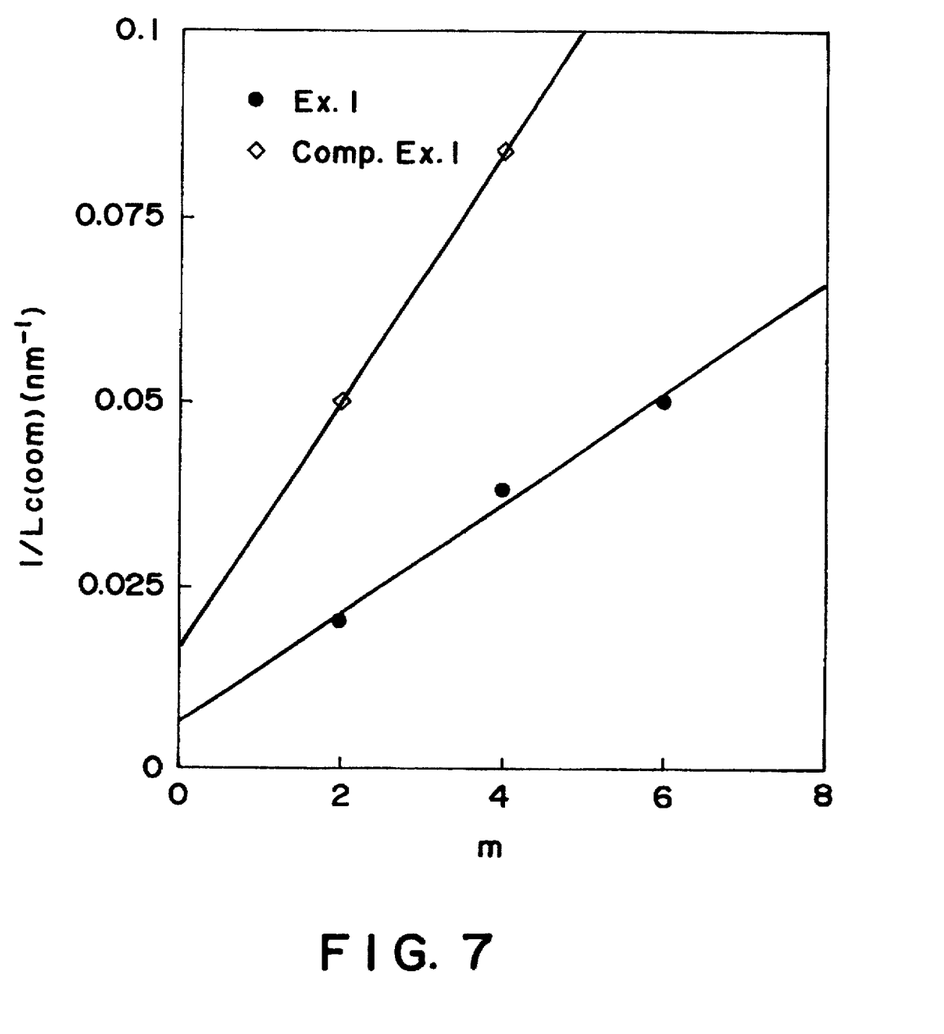

Lattice strain ε is determined in the following manner. The following formula is given as a relationship among a lattice strain $\epsilon$, $L_{c(00m)}$ and $d_{002}$ for a (00m) diffraction peak for a carbonaceous material (e.g., Mizushima "Tanso" No. 52, 9-(1968)). (Incidentally, the term "(00l) diffraction peak" is generally used in literature but the alphabet "l" is very confusing with a numeral "1", so that the term (00m) diffraction peak is used herein).

$$1/L_{c(00m)} = 1/L_0 + (m/2) \times (\epsilon/2d_{002}),$$

wherein $L_0$ denotes a crystalline size in the case where no strain $\epsilon$ is present. Accordingly, a linear plot of $L_{c(00m)}$ versus m provides a slope ($\epsilon/4d_{002}$), from which $\epsilon$ is determined based on the above-determined $d_{002}$ value. (See, e.g., FIG. 7 showing plots for graphitic materials of Example 1 and Comparative Example 1.)

[True Density]

The true density of a carbonaceous material sample is measured by the butanol method prescribed in JIS R7212.

[Volatile Content]

The volatile content of a pitch sample is measured according to a method prescribed in JIS R7212 with the proviso that a sample is heated at 800° C. for 30 min.

[Softening Point]

A Kohka-type flow tester (available from Shimadzu Seisakusho K.K.) is used. A sample in an amount of 1 g, after being pulverized into a size of at most 250 µm, is packed in a cylinder having an inner sectional area of 1 cm² and provided at its bottom with a 1 mm-dia. nozzle and, under a load of 9.8 N/cm² (10 kg/cm²), is heated at a rate of 6° C./min. Along with the temperature increase, sample particles are softened to provide an increased packing ratio and a decrease in sample volume, but the volume decrease ceases above a certain temperature. On further heating, the sample is melted to flow out through the nozzle at the cylinder bottom. The softening point of the sample is determined as the temperature at which the sample volume decrease ceases. Incidentally, it is possible that a sample having a high softening point does not flow out through the nozzle.

[Polarizing Microscopic Observation]

A sample for the observation is prepared by (i) in case of a powdery graphitic material, adding about 10 wt. % of the graphitic material into liquid epoxy resin and, after sufficient mixing, charging the resultant mixture in a mold frame (in a diameter of 25 mm) of silicone rubber or (ii) in case of particle-shaped or block-shaped graphitic material, optionally formulating the graphitic material into particles of several millimeters in diameter and embedding several particles within liquid epoxy resin charged in the above-mentioned mold frame, respectively followed by curing the epoxy resin at 120° C. for 24 hours. The resultant cured epoxy resin is cut at an appropriate part thereof so as to expose the embedded graphitic material at the surface, followed by buffing for mirror finishing. The thus-prepared sample is observed through a polarizing microscope under cross nicols at a magnification of ca. 1000.

[EXAMPLES]

Hereinbelow, the present invention will be described more specifically with reference to Examples and Comparative Examples.

Example 1

1000 g of naphthalene (reagent-grade, available from Kanto Kagaku K.K.) and $AlCl_3$ (catalyst) (reagent-grade, available from Kanto Kagaku K.K.) were placed in a three-necked flask equipped with a stirrer and subjected to polymerization at 210° C. for 60 hours. After the polymerization, the resultant polymerizate was washed with water and filtrated by using a filter (pore diameter: 0.2 µm) for catalyst removal to recover the polymerizate. The polymerizate was then heated at 400° C. for 15 min. at a reduced pressure of 2 kPa and under a nitrogen gas stream to remove light fractions.

The thus-obtained pitch (which may be called "polynaphthalene pitch") had a softening point of 195° C., a benzene-insoluble content of 42.9%, an H/C atomic ratio of 0.64, and an average molecular weight of 1300.

The pitch was heat-treated at 600° C. for 1 hour in a nitrogen gas stream and then pulverized to obtain carbon precursor particles having an average particle size (diameter) of ca. 25 µm. The carbon precursor particles were carbonized at 1000° C. for 1 hour in a nitrogen gas stream and then graphitized at 2400° C. for 1 hour in an argon gas stream to obtain a graphitic material. As a result of the polarizing microscopic observation; the graphitic material showed an optically anisotropic texture characterized as a flow texture.

Example 2

A graphitic material was prepared in the same manner as in Example 1 except that the graphitization temperature was changed to 2200° C. As a result of the polarizing microscopic observation, the graphitic material showed an optically anisotropic texture characterized as a flow texture.

Example 3

The polynaphthalene pitch obtained in Example 1 was heat-treated at 600° C. for 1 hour in a nitrogen gas stream, then carbonized at 1000° C. for 1 hour in a nitrogen gas stream and then graphitized at 2400° C. for 1 hour in an argon gas stream, followed by pulverization to obtain a graphitic material in the form of particles having an average particle size of ca. 25 µm.

As a result of the polarizing microscopic observation, the graphitic material showed an optically anisotropic texture characterized as a flow texture.

Example 4

A petroleum pitch having a softening point of 210° C., a quinoline-insoluble content of 1 wt. % and an H/C atomic ratio of 0.63 was heat-treated at 600° C. for 1 hour in a nitrogen gas stream, and pulverized to obtain carbon precursor particles having an average particle size of ca. 25 µm. The carbon precursor particles were carbonized at 1000° C. for 1 hour in a nitrogen gas stream and graphitized at 2800° C. for 1 hour in an argon gas stream to obtain a graphitic material.

As a result of the polarizing microscopic observation, the graphitic material showed an optically anisotropic texture characterized as a flow texture.

Comparative Examples 1 and 2

Graphitic materials were prepared in the same manner as in Example 1 except that the graphitization temperature was changed to 2000° C. (Comparative Example 1) and 2800° C. (Comparative Example 2), respectively.

Comparative Example 3

Coal tar pitch was heat-treated at 600° C. for 1 hour in a nitrogen gas stream and pulverized to obtain carbon precursor particles having an average particle size of ca. 25 μm. The carbon precursor particles were carbonized at 1000° C. for 1 hour in a nitrogen gas stream and then graphitized at 2800° C. for 1 hour in an argon gas stream to obtain a graphitic material.

Comparative Example 4

Needle coke of ca. 25 μm in average diameter was graphitized at 2800° C. for 1 hour in an argon gas stream to obtain a graphitic material.

Comparative Example 5

Flaky graphite produced in Madagascar ("CP", available from Nippon Kokuen Shoji K.K.) was used.

The natural graphite showed a fixed carbon content of 97%, an ash content of 2%, a volatile content of 1% and an average particle size of 7 μm.

The properties of the above-mentioned graphitic materials are shown in the following Table 1.

FIGS. 4–7 show (002) x-ray diffraction patterns (FIG. 4), (004) x-ray diffraction pattern (FIG. 5), (112) and (006) x-ray diffraction patterns (FIG. 6) and $1/L_{c(00m)}$-m plots for calculating lattice strains $\epsilon$ (FIG. 7) of graphitic materials of Example 1 and Comparative Example 1, for example.

showing a stable performance was used as a negative electrode, and each graphitic material prepared above was used to constitute a positive electrode, thereby forming a lithium secondary battery, of which the performances were evaluated.

More specifically, the positive electrode was prepared as follows. That is, 90 wt. parts of the graphitic material thus formulated in the form of fine particles and 10 wt. parts of polyvinylidene fluoride were mixed together with N-methyl-2-pyrrolidone to form a paste-like composite, which was then applied uniformly onto a copper foil. The composite, after being dried, was peeled off the copper foil and stamped into a 21 mm-dia. disk. The disk was then press-bonded onto a 21 mm-dia. circular shaped net of stainless steel to form a positive electrode containing about 40 mg of the graphitic material. On the other hand, a negative electrode was prepared by stamping a 1 mm-thick sheet of lithium metal into a 21 mm-dia. disk.

The thus-prepared positive and negative electrodes were disposed opposite to each other with a porous polypropylene film as a separator disposed therebetween, and the resultant structure was dipped in an electrolytic solution comprising a 1:1 (by volume)-mixture solvent of ethylene carbonate and diethyl carbonate and $LiPF_6$ dissolved therein at a rate of 1 mol/liter, thereby forming a non-aqueous solvent-type lithium secondary battery.

In the lithium secondary battery thus constituted, the graphitic material in the positive electrode was subjected to doping and dedoping of lithium to evaluate capacities therefor.

More specifically, the doping was effected by repeating a cycle including charging at a constant current density of 0.5

TABLE 1

| | | Properties of graphitic materials*[1] | | | | |
|---|---|---|---|---|---|---|
| | | Starting material | Graphitization temp. (°C.) | $d_{002}$ (nm) | $L_{c(002)}$ (nm) | $\epsilon \times 10^2$ (nm$^{-1}$) | True density (g/cm$^3$) |
| Example | 1 | PN pitch*[2] | 2400 | 0.340 | 49 | 1.01 | 2.20 |
| | 2 | PN pitch | 2200 | 0.339 | 41 | 1.33 | 2.18 |
| | 3 | PN pitch | 2400 | 0.338 | 56 | 0.93 | 2.20 |
| | 4 | petroleum pitch | 2800 | 0.339 | 44 | 0.92 | 2.21 |
| Comp. | 1 | PN pitch | 2000 | 0.344 | 20 | 2.18 | 2.16 |
| Example | 2 | PN pitch | 2800 | 0.337 | 70 | 0.53 | 2.22 |
| | 3 | coal tar | 2800 | 0.338 | 63 | 0.64 | 2.22 |
| | 4 | needle coke | 2800 | 0.336 | 70 | 0.52 | 2.22 |
| | 5 | natural graphite | | 0.336 | >100 | | 2.27 |

*[1]The underlined properties are outside the range of the present invention.
*[2]PN pitch = polynaphthalene pitch

[Doping/De-doping Capacity for Active Substance]

The graphitic materials obtained in Examples and Comparative Examples were respectively used to prepare a non-aqueous solvent-type secondary battery (cell) and the performances thereof were evaluated in the following manner.

The graphitic material of the present invention is generally suited for constituting a negative electrode of a non-aqueous solvent secondary battery. However, in order to accurately evaluate the performances of a graphitic material inclusive of a doping capacity (A) and a de-doping capacity (B) for a cell active substance and also an amount of the cell active substance remaining in the graphitic material without being dedoped ("irreversible capacity" (A–B)) without being affected by a fluctuation in performance of a counter electrode material, a large excess amount of lithium metal mA/cm$^2$ up to an electrode potential of 60 mV and a subsequent constant voltage charging up to a total current conduction time of 15 hours. The electricity thus flowed was divided by the weight of the graphitic material to provide a doping capacity (A) in terms of Ah/kg. Then, in a similar manner, a current was flowed in a reverse direction to dedope the lithium from the doped graphitic material. The de-doping was effected by constant-current discharging at a current density of 0.5 mA/cm$^2$ down to a terminal voltage of 1.0 V. The electricity thus flowed was divided by the weight of the graphitic material to provide a dedoping capacity (B) in terms of Ah/kg. Then, an irreversible capacity (non-dedoped capacity) (A–B) was calculated as a difference between the doping capacity (A) and the dedoping capacity (B).

The performances of the lithium secondary batteries using positive electrodes of the respective graphitic materials measured in the above-described manner are summarized in the following Table 2.

TABLE 2

| | | Secondary battery performances | | |
|---|---|---|---|---|
| | Doping capacity (A) (Ah/kg) | Dedoping capacity (B) (Ah/kg) | Irreversible capacity (A − B) (Ah/kg) | Discharge efficiency (A − B)/A × 100 (%) |
| Example 1 | 267 | 239 | 28 | 90 |
| 2 | 239 | 218 | 21 | 91 |
| 3 | 285 | 236 | 49 | 83 |
| 4 | 264 | 232 | 32 | 88 |
| Comp. 1 | 194 | 175 | 19 | 91 |
| Example 2 | 307 | 201 | 107 | 65 |
| 3 | 302 | 177 | 245 | 59 |
| 4 | 282 | 190 | 92 | 67 |
| 5 | 253 | 174 | 79 | 69 |

As is understood from Table 2, lithium secondary batteries prepared by using the graphitic materials obtained in Examples showed larger dedoping capacities and generally better discharge efficiencies than the batteries obtained by using the graphitic materials of Comparative Examples 1–5.

More specifically, the carbonaceous material prepared in Comparative Example 1 failed to show a (112) diffraction peak as a result of X-ray diffraction (FIG. 6), thus showing insufficient graphitization, and a secondary battery obtained by using the material showed a small doping capacity. On the other hand, the batteries obtained by using graphitic materials prepared in Comparative Examples 2–4 and natural graphite (Comparative Example 5) exhibited very large irreversible capacities. This is presumably because the graphitic materials have a developed graphite structure and have a large crystallite size to result in a high overvoltage when lithium is inserted between graphite layers, which promotes the decomposition of the electrolytic solution leading to an increase in irreversible capacity.

[Quick Charge/Discharge Test]

Lithium secondary batteries prepared in the above-described manner and including positive electrode of graphitic materials obtained in Example 1 and Comparative Examples 2–4, respectively, were subjected to the following quick charge/discharge (i.e., doping/dedoping) test.

Each battery was subjected to doping/dedoping at different current densities of 0.5 mA/cm$^2$, 1 mA/cm$^2$, and 2 mA/cm$^2$.

More specifically, the doping was performed at a constant current density as prescribed above until the terminal voltage reached 60 mV and thereafter the doping was performed at a constant voltage of 60 mV. The doping was continued for periods prescribed for the respective current densities, i.e., 15 hours for a current density of 0.5 mA/cm$^2$, 7.5 hours for 1 mA/cm$^2$, and 3.75 hours for 2 mA/cm$^2$. The dedoping was performed at a current density identical to that for the doping and completed when the terminal voltage reached 1.0 volt.

Figure 3:
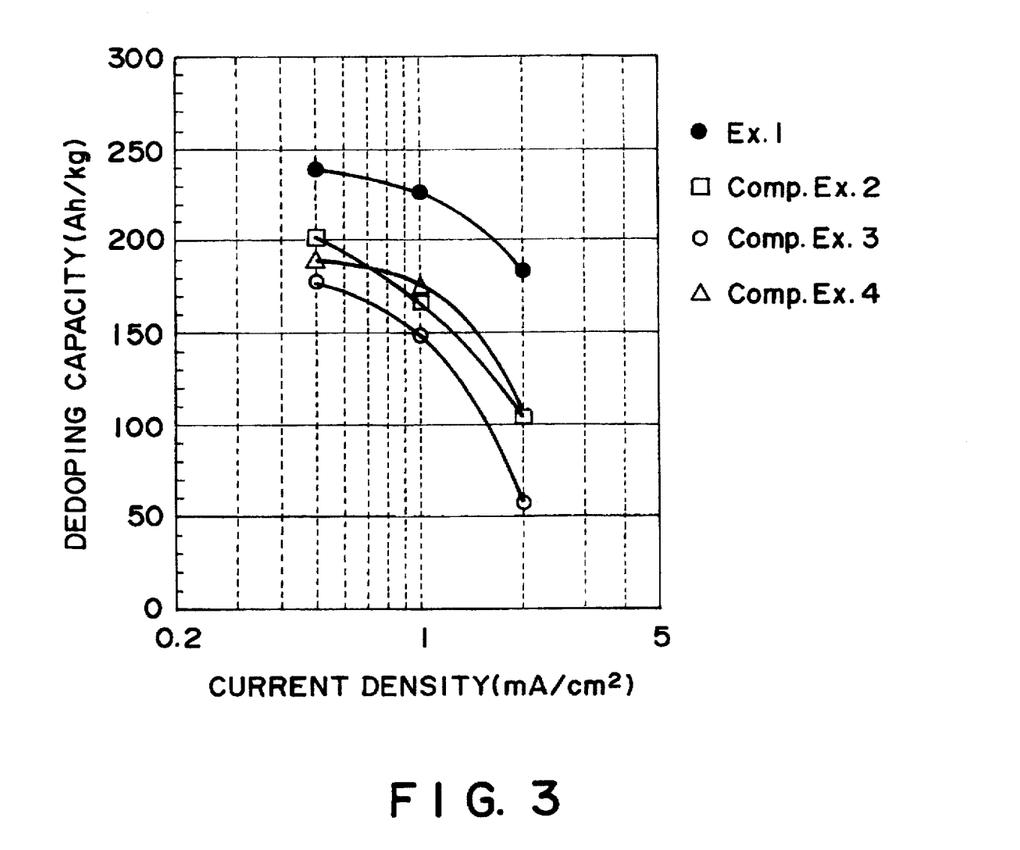
FIG. 3 is a graph showing dedoping capacities at varying current densities of lithium secondary batteries including electrodes of different graphitic materials.
Figure 4:
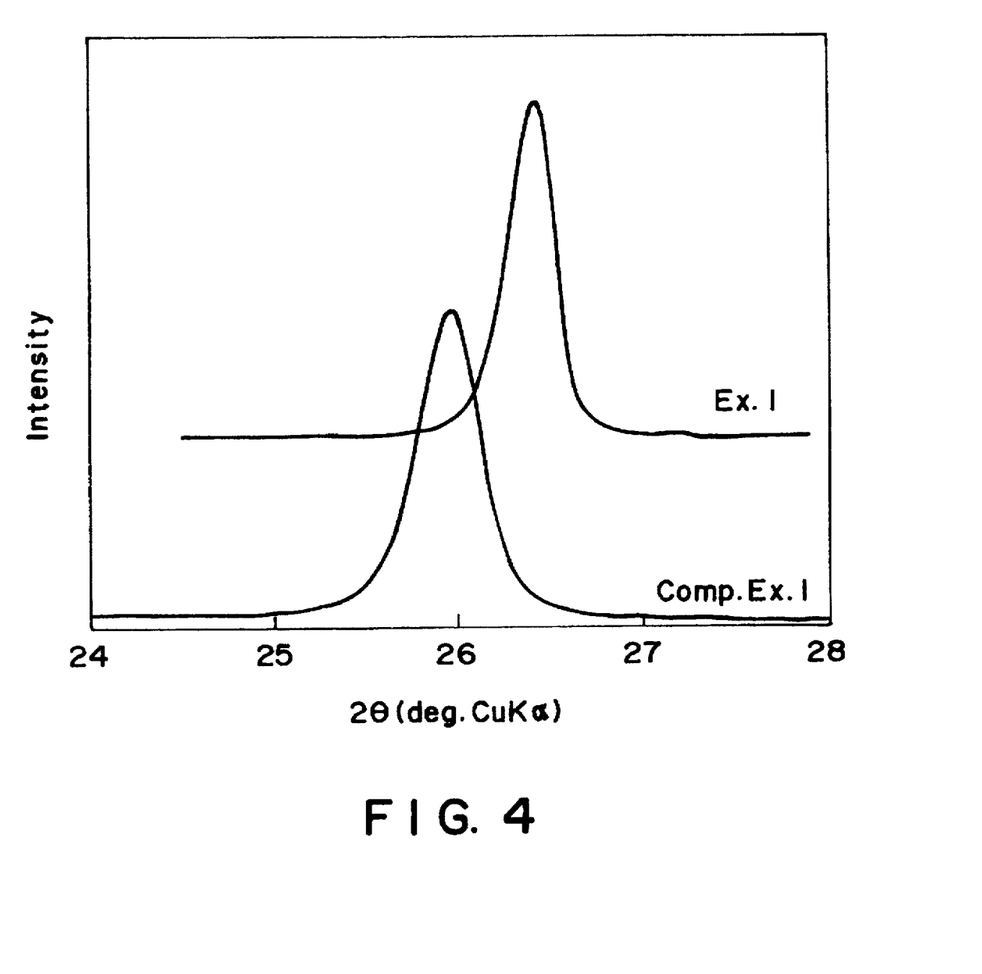
FIGS. 4–7 show (002) x-ray diffraction patterns (FIG. 4), (004) x-ray diffraction patterns (FIG. 5), (112) and (006) x-ray diffraction patterns (FIG. 6) and $1/L_{c(00m)}$-m plots for calculating lattice strains $\epsilon$ (FIG. 7) of graphitic materials of Example 1 and Comparative Example 1.
Figure 5:
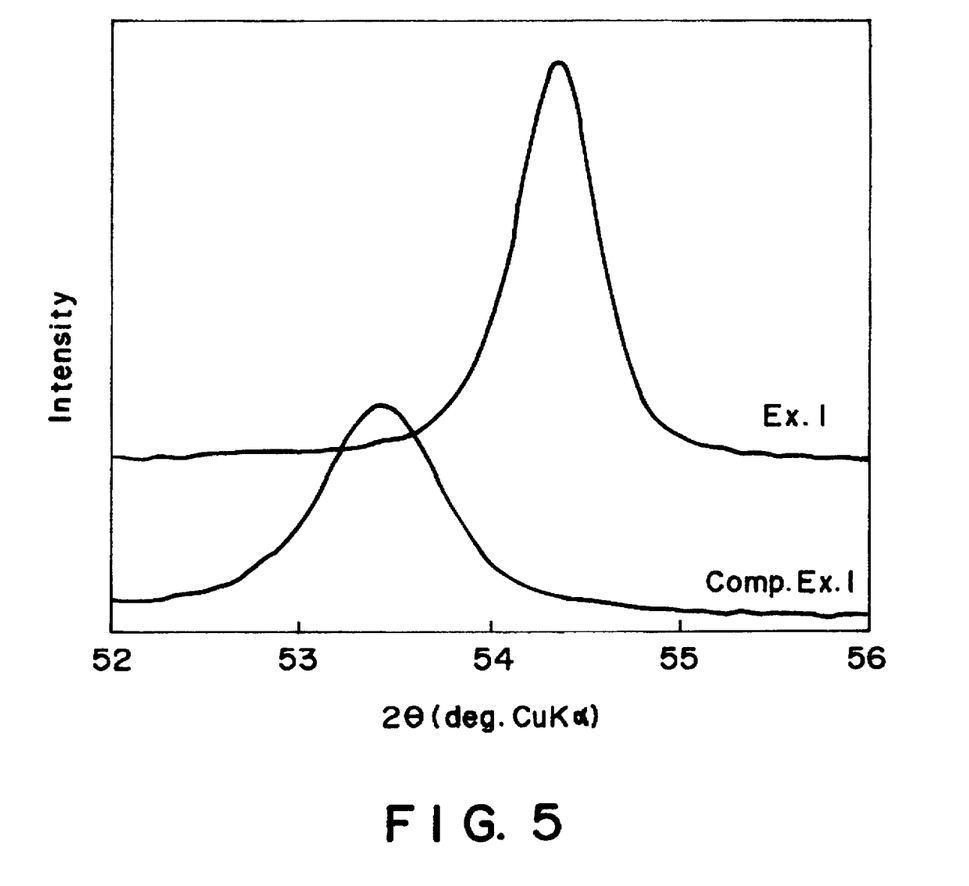
Figure 6:
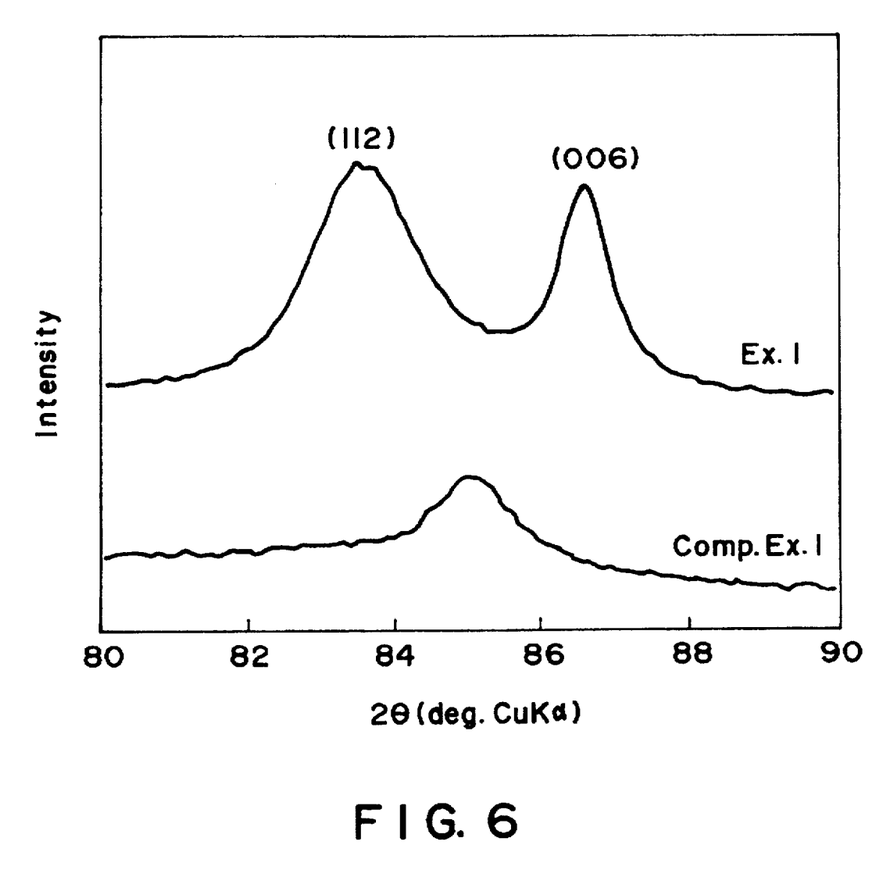

FIG. 3 shows the plots of dedoping capacities at varying current densities of the respective batteries measured in the above-described manner. As shown in FIG. 3, the lithium secondary battery including a positive electrode of graphitic material obtained in Example 1 retained a high dedoping capacity even at a high current density.

What is claimed is:

1. A graphitic electrode material for a non-aqueous solvent-type secondary battery, characterized by having an average (002)-plane spacing $d_{002}$ of 0.336–0.345 nm, a crystallite size along c-axis $L_{c(002)}$ of 15–60 nm, and a lattice strain $\epsilon$ of at most $2.0 \times 10^{-2}$ nm$^{-1}$ as measured by X-ray diffraction method.

2. A graphitic electrode material according to claim 1, having a lattice strain $\epsilon$ of at most $1.0 \times 10^{-2}$ nm$^{-1}$.

3. A graphitic electrode material according to claim 1, having a true density of at least 1.90 g/cm$^3$.

4. A process for producing a graphitic electrode material according to claim 1, comprising the steps of: thermally polymerizing a condensed polycyclic aromatic compound in the presence of a Lewis acid catalyst to form a polymerizate, and heat-treating the polymerizate at 2100°–2600° C. under a reduced pressure or in an inert gas atmosphere.

5. A process according to claim 4, further including a step of heat-treating the polymerizate to form a carbon precursor so that the carbon precursor is subjected to a further heat treatment including the heat-treatment at 2100°–2600° C.

6. A process according to claim 4, wherein said carbon precursor is pulverized before it is subjected to said further heat treatment.

7. A process according to claim 4, wherein said condensed polycyclic aromatic compound comprises a member selected from the group consisting of naphtharene, anthracene, acenaphthene acenaphthylene, pyrene, and derivatives of these having one or more aliphatic substituents.

8. A process according to claim 4, wherein said Lewis acid catalyst comprises a member selected from the group consisting of aluminum chloride, boron trifluoride, aluminum bromide, tin chloride, iron chloride, zinc chloride, and hydrogen fluoride-boron trifluoride complex.

9. A battery electrode structure, comprising: an electroconductive substrate and a composite electrode layer disposed on at least one surface of the electroconductive substrate;

said composite electrode layer comprising a carbonaceous material according to any one of claims 1 to 3 in a particulate form, and a binder.

10. A battery, comprising, a positive electrode, a negative electrode, and an electrolyte disposed between the positive and negative electrodes;

at least one of said positive and negative electrodes comprising an electrode structure according to claim 9.

* * * * *